US012565050B2

(12) United States Patent
Hoffman, Jr. et al.

(10) Patent No.: US 12,565,050 B2
(45) **Date of Patent: *Mar. 3, 2026**

(54) HYBRID SILK SCREEN AND DIRECT-TO-GARMENT PRINTING MACHINE AND PROCESS

(71) Applicant: M&R Printing Equipment, Inc., Roselle, IL (US)

(72) Inventors: Richard C. Hoffman, Jr., Lake Forest, IL (US); Geoff Baxter, Media, PA (US)

(73) Assignee: M&R Printing Equipment, Inc., Roselle, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/417,358

(22) Filed: Jan. 19, 2024

(65) Prior Publication Data

US 2024/0308243 A1 Sep. 19, 2024

Related U.S. Application Data

(63) Continuation of application No. 17/191,912, filed on Mar. 4, 2021, now Pat. No. 11,912,047, which is a (Continued)

(51) Int. Cl.
*B41J 3/407* (2006.01)
*B41F 11/00* (2006.01)
(Continued)

(52) U.S. Cl.
CPC ............ *B41J 3/4078* (2013.01); *B41F 11/00* (2013.01); *B41F 15/0863* (2013.01);
(Continued)

(58) Field of Classification Search
CPC ...... B41J 3/4078; B41J 3/546; B41J 11/0015; B41J 11/007; B41F 11/00; B41F 15/0863;
(Continued)

(56) References Cited

U.S. PATENT DOCUMENTS 3,795,189 A 3/1974 Jaffa
4,248,150 A 2/1981 Lala
(Continued)

FOREIGN PATENT DOCUMENTS

AU 2016308447 B2 2/2020
AU 2020203369 A1 6/2020
(Continued)

OTHER PUBLICATIONS

Korean Intellectual Property Office, International Search Report for PCT/US2016/046830, 3 pages, mailed Dec. 19, 2016 Dec. 19, 2016.
(Continued)

*Primary Examiner* — Douglas X Rodriguez
*Assistant Examiner* — Tracey M McMillion
(74) *Attorney, Agent, or Firm* — Benjamin D. Rotman; UB Greensfelder LLP

(57) ABSTRACT

A hybrid printing machine is described having both silk screening stations and a direct-to-garment digital printing station with a raster image processor to control a portion of a printing process.

19 Claims, 4 Drawing Sheets

Related U.S. Application Data continuation of application No. 16/851,702, filed on Apr. 17, 2020, now Pat. No. 10,967,650, which is a continuation of application No. 16/192,948, filed on Nov. 16, 2018, now Pat. No. 10,625,517, which is a continuation of application No. 15/235,982, filed on Aug. 12, 2016, now Pat. No. 10,131,160.

(60) Provisional application No. 62/205,416, filed on Aug. 14, 2015.

(51) Int. Cl.

| | |
|---|---|
| ***B41F 15/08*** | (2006.01) |
| ***B41F 15/10*** | (2006.01) |
| ***B41F 17/00*** | (2006.01) |
| ***B41J 3/54*** | (2006.01) |
| ***B41J 11/00*** | (2006.01) |

(52) U.S. Cl.
CPC ............ *B41F 15/10* (2013.01); *B41F 17/003* (2013.01); *B41J 3/546* (2013.01); *B41J 11/0015* (2013.01)

(58) Field of Classification Search
CPC ........ B41F 15/10; B41F 17/003; B41F 15/14; B41M 1/26; B41M 5/0047; B41M 5/0041
See application file for complete search history.

(56) References Cited

U.S. PATENT DOCUMENTS

| | | | |
|---|---|---|---|
| 4,735,139 | A | 4/1988 | Szarka |
| 4,819,559 | A | 4/1989 | Szarka |
| 4,909,146 | A | 3/1990 | Szarka |
| 4,939,991 | A | 7/1990 | Szarka |
| 5,063,842 | A | 11/1991 | Clarke |
| 5,129,155 | A | 7/1992 | Hoffman, Jr. et al. |
| 5,195,434 | A | 3/1993 | Hoffman, Jr. |
| 5,199,353 | A | 4/1993 | Szyszko |
| 5,216,820 | A | 6/1993 | Green et al. |
| 5,383,400 | A | 1/1995 | Szyszko |
| D360,423 | S | 7/1995 | Neal |
| 5,456,172 | A | 10/1995 | Herrmann |
| 5,503,067 | A | 4/1996 | Jaffa |
| 5,575,206 | A | 11/1996 | Szyszko |
| 5,592,877 | A | 1/1997 | Szyszko et al. |
| 5,595,113 | A | 1/1997 | Daniel et al. |
| 5,607,243 | A | 3/1997 | Szarka |
| 5,640,905 | A | 6/1997 | Szyszko et al. |
| 5,649,479 | A | 7/1997 | Hoffman, Jr. |
| 5,678,482 | A | 10/1997 | Daniel et al. |
| 5,745,365 | A | 4/1998 | Parker |
| 5,782,184 | A | 7/1998 | Albertalli |
| 5,787,805 | A | 8/1998 | Szyszko et al. |
| 5,809,877 | A | 9/1998 | Szyszko et al. |
| 5,845,569 | A | 12/1998 | Tkacz et al. |
| 5,881,641 | A | 3/1999 | Tkacz |
| 5,887,519 | A | 3/1999 | Zelko |
| 5,921,176 | A | 7/1999 | Oleson |
| 5,937,749 | A | 8/1999 | Ford |
| 5,943,953 | A | 8/1999 | Oleson |
| 5,953,987 | A | 9/1999 | Oleson |
| 6,012,387 | A | 1/2000 | Hoffman, Jr. et al. |
| 6,089,149 | A | 7/2000 | Zelko |
| 6,105,494 | A | 8/2000 | Hoffman, Jr. et al. |
| 6,112,654 | A | 9/2000 | Jaffa |
| 6,142,070 | A | 11/2000 | Hoffman, Jr. et al. |
| 6,161,304 | A | 12/2000 | Iaccino et al. |
| 6,168,269 | B1 | 1/2001 | Rasmussen et al. |
| 6,276,274 | B1 | 8/2001 | Hoffman, Jr. et al. |
| 6,289,802 | B1 | 9/2001 | Zelko |
| 6,361,230 | B1 | 3/2002 | Crystal |
| 6,484,629 | B1 | 11/2002 | Hoffman, Jr. et al. |
| 6,698,879 | B1 | 3/2004 | Hindriks et al. |
| 6,780,460 | B1 | 8/2004 | Ou-Yang |
| 6,910,419 | B2 | 6/2005 | Oleson |
| 7,134,749 | B2 | 11/2006 | Ben-Zur et al. |
| 7,231,873 | B2 * | 6/2007 | Macchi .................... B41J 3/546 101/115 |
| 7,562,957 | B2 | 7/2009 | Mills et al. |
| 7,607,745 | B2 | 10/2009 | Ben-Zur |
| 8,292,395 | B2 | 10/2012 | Ben-Zur et al. |
| 8,333,468 | B2 | 12/2012 | Laaspere et al. |
| 8,498,018 | B2 | 7/2013 | Doggett et al. |
| 8,540,358 | B2 | 9/2013 | Mozel et al. |
| 8,640,618 | B2 | 2/2014 | Takahata |
| 8,662,651 | B2 | 3/2014 | Kagata et al. |
| 8,708,437 | B2 | 4/2014 | Kushner et al. |
| 8,746,824 | B2 | 6/2014 | Usuda et al. |
| 8,784,508 | B2 | 7/2014 | Ellis |
| 8,960,891 | B2 | 2/2015 | Hacker et al. |
| 9,150,041 | B2 | 10/2015 | Biel et al. |
| 9,393,773 | B2 | 7/2016 | Hoffman, Jr. et al. |
| 9,527,274 | B2 | 12/2016 | Oleson |
| 9,611,401 | B2 | 4/2017 | Mozel et al. |
| 9,656,475 | B2 | 5/2017 | Miller |
| 10,131,160 | B2 | 11/2018 | Hoffman, Jr. et al. |
| 10,625,517 | B2 | 4/2020 | Hoffman, Jr. et al. |
| 10,899,142 | B2 | 1/2021 | Amir et al. |
| 10,967,650 | B2 | 4/2021 | Hoffman, Jr. et al. |
| 11,021,627 | B2 | 6/2021 | Mozel et al. |
| 11,046,068 | B2 | 6/2021 | Richards et al. |
| 11,072,398 | B2 | 7/2021 | Kucaba et al. |
| 11,077,676 | B2 | 8/2021 | Efendi et al. |
| 11,098,214 | B2 | 8/2021 | Shimoni et al. |
| 2003/0090536 | A1 | 5/2003 | Sloan |
| 2003/0121430 | A1 | 7/2003 | Eppinger |
| 2003/0142168 | A1 | 7/2003 | Suzuki |
| 2004/0000240 | A1 | 1/2004 | Oleson |
| 2004/0196346 | A1 * | 10/2004 | Redding .............. H04N 1/6058 347/100 |
| 2004/0252173 | A1 | 12/2004 | Ben-Zur et al. |
| 2005/0179708 | A1 | 8/2005 | Ben-Zur |
| 2005/0223918 | A1 | 10/2005 | Steffen et al. |
| 2005/0252394 | A1 | 11/2005 | Eppinger |
| 2006/0162586 | A1 | 7/2006 | Fresener et al. |
| 2006/0207448 | A1 | 9/2006 | Fresener et al. |
| 2006/0210719 | A1 | 9/2006 | Smith |
| 2006/0249039 | A1 | 11/2006 | Feldman et al. |
| 2006/0266232 | A1 | 11/2006 | Macchi |
| 2007/0103529 | A1 | 5/2007 | Pearl et al. |
| 2007/0124870 | A1 | 6/2007 | Turner |
| 2007/0188535 | A1 | 8/2007 | Elwakil et al. |
| 2008/0012884 | A1 | 1/2008 | Ben-Zur et al. |
| 2010/0000429 | A1 | 1/2010 | Hoffman, Jr. et al. |
| 2010/0141694 | A1 | 6/2010 | Kurasawa |
| 2010/0214349 | A1 | 8/2010 | Ozawa |
| 2011/0032304 | A1 * | 2/2011 | Mozel ....................... D06P 5/02 524/556 |
| 2011/0254888 | A1 | 10/2011 | Kasahara |
| 2011/0290127 | A1 | 12/2011 | Biel et al. |
| 2013/0284036 | A1 | 10/2013 | Wade et al. |
| 2014/0261029 | A1 * | 9/2014 | Oleson ...................... G03F 1/50 101/129 |
| 2015/0068417 | A1 | 3/2015 | Szyszko |
| 2016/0023454 | A1 | 1/2016 | Sloan |
| 2016/0207301 | A1 | 7/2016 | Szyszko |
| 2017/0043592 | A1 | 2/2017 | Hoffman, Jr. et al. |
| 2017/0145239 | A1 | 5/2017 | Mozel et al. |
| 2018/0148592 | A1 | 5/2018 | Morrison et al. |
| 2018/0320016 | A1 | 11/2018 | Iraqi et al. |
| 2018/0370253 | A1 | 12/2018 | Ohnishi |
| 2019/0144699 | A1 | 5/2019 | Iraqi et al. |
| 2019/0152237 | A1 | 5/2019 | Hoffman, Jr. et al. |
| 2019/0202214 | A1 | 7/2019 | Allen et al. |
| 2020/0316963 | A1 | 10/2020 | Hoffman, Jr. et al. |
| 2021/0114381 | A1 | 4/2021 | Efendi et al. |
| 2021/0114395 | A1 | 4/2021 | Efendi et al. |

(56) References Cited

U.S. PATENT DOCUMENTS

| | | | |
|---|---|---|---|
| 2021/0130635 A1 | 5/2021 | Mozel et al. | |
| 2021/0394529 A1 | 12/2021 | Efendi | |

FOREIGN PATENT DOCUMENTS

| | | | | |
|---|---|---|---|---|
| AU | 2021203885 A1 | 7/2021 | | |
| CA | 2995618 A1 | 2/2017 | | |
| CN | 101596518 A | 12/2009 | | |
| CN | 201538103 U | 8/2010 | | |
| CN | 102619114 A | 8/2012 | | |
| CN | 103350561 A1 | 10/2013 | | |
| CN | 108349237 B | 6/2020 | | |
| CN | 111806069 A | 10/2020 | | |
| EP | 1726444 A1 | 11/2006 | | |
| EP | 2130680 A1 * | 12/2009 | .......... | B41J 11/0015 |
| EP | 2452823 A2 | 5/2012 | | |
| EP | 1741555 B2 | 7/2015 | | |
| EP | 3334604 B1 | 9/2020 | | |
| EP | 3769965 A1 | 1/2021 | | |
| FR | 2604119 A1 | 3/1988 | | |
| KR | 2018005 1535 A | 5/2018 | | |
| WO | 2000073071 A1 | 12/2000 | | |
| WO | 2001025011 A1 | 4/2001 | | |
| WO | 2009079572 A1 | 6/2009 | | |
| WO | 2009105693 A2 | 8/2009 | | |
| WO | 2017030982 A1 | 2/2017 | | |
| WO | 2018078634 A1 | 5/2018 | | |
| WO | 2018138720 A1 | 8/2018 | | |
| WO | 2019049135 A1 | 3/2019 | | |
| WO | 2019077615 A1 | 4/2019 | | |
| WO | 2021076294 A1 | 4/2021 | | |
| WO | 2021076295 A1 | 4/2021 | | |

OTHER PUBLICATIONS

Korean Intellectual Property Office, Written Opinion of International Searching Authority for PCT/US2016/046830, 10 pages, mailed Dec. 19, 2016 Dec. 19, 2016.

European Patent Office, Extended European Search Report for Application No. 16837601.0, 8 pages, mailed Jan. 8, 2019 Jan. 8, 2019.

FESPA Staff, "Roq to launch Hybrid DTG printer at FESPA 2017," retrieved on Jun. 14, 2019 from https://www.fespa.com/en/news-media/industry/roq-to-launch-hybrid-dtg-printer-at-fespa-2017, 5 pages, published May 4, 2017 May 4, 2017.

ROQ, "ROQ Hybrid, A New Dawn for Screen Printing," retrieved on Jun. 14, 2019 from https://roqinternational.com/features/roq-hybrid-a-new-dawn-for-screen-printing/, 5 pages, published Nov. 15, 2016 Nov. 15, 2016.

ROQ, "ROQ Returns to Maquitex," retrieved on Jun. 14, 2019 from http:/roqinternational.com/news/roq-retums-to-maquitex/, 4 pages, published Sep. 11, 2017 Sep. 11, 2017.

Cahill, Vince, "Hybrid Garment Printing," 19 pages, published Oct. 10, 2019 Oct. 10, 2019.

Moxley, Michelle, "Best of Both Worlds: Digital Hybrid and Variable Data Printing," Screen Printing, Apr./May 2019, retrieved on Aug. 4, 2020 from https://www.nxtbook.com/nxtbookds/STMG/sp_20190405/index.php#/p/22, 3 pages, published 2019 2019.

Lawson Screen & Digital Products, Inc., "What is Hybrid Printing and the Digital Squeegee," https//www.lawsonsp.com, 11 pages, published Jul. 23, 2019 Jul. 23, 2019.

European Patent Office, Extended European Search Report for European Application No. 20197322.9, mailed Dec. 1, 2020, 9 pages Dec. 1, 2020.

Korean Intellectual Property Office, International Search Report for International Application No. PCT/US2020/052547, mailed Jan. 12, 2021, 3 pages Jan. 12, 2021.

Korean Intellectual Property Office, Written Opinion of the International Searching Authority for International Application No. PCT/US2020/052547, mailed Jan. 12, 2021, 6 pages Jan. 12, 2021.

Korean Intellectual Property Office, International Search Report for International Application No. PCT/US2020/052546, mailed Jan. 13, 2021, 4 pages Jan. 13, 2021.

Korean Intellectual Property Office, Written Opinion of the International Searching Authority for International Application No. PCT/US2020/052546, mailed Jan. 13, 2021, 8 pages Jan. 13, 2021.

China National Intellectual Property Administration, English translation of the Notification of the First Office Action for Chinese Application No. 202010463066.X, dated Apr. 27, 2021, 12 pages Apr. 27, 2021.

* cited by examiner

HYBRID SILK SCREEN AND DIRECT-TO-GARMENT PRINTING MACHINE AND PROCESS

CROSS-REFERENCE TO RELATED APPLICATIONS

This application is a continuation of U.S. patent application Ser. No. 17/191,912 filed Mar. 4, 2021, which is a continuation of U.S. patent application Ser. No. 16/851,702 filed Apr. 17, 2020, now U.S. Pat. No. 10,967,650, which is a continuation of U.S. patent application Ser. No. 16/192,948 filed Nov. 16, 2018, now U.S. Pat. No. 10,625,517, which is a continuation of U.S. patent application Ser. No. 15/235,982 filed Aug. 12, 2016, now U.S. Pat. No. 10,131,160, which claims priority to U.S. Provisional Patent Application No. 62/205,416 filed on Aug. 14, 2015, the contents of which are incorporated herein by reference and made a part hereof.

FEDERALLY SPONSORED RESEARCH OR DEVELOPMENT

N/A

FIELD OF THE INVENTION

A hybrid printing machine having a silk screening printing station and a direct-to-garment printing station for printing images on textiles and other substrates and a process for printing textiles.

DESCRIPTION OF THE PRIOR ART

Screen printing is an art form that is thousands of years old and involves depositing ink on a screen with a pattern thereon and squeegeeing the ink so that it passes through the screen onto the item to be screened. Screen printing is commonly used for decorating clothing such as T-shirts, pants, and other items like hand bags and totes. Boutiques which specialize in printing fanciful indicia such as ornamentation, slogans, college names, or sports team names on T-shirts and other clothing are commonly seen in shopping malls. The indicia available at these boutiques can be pre-printed on a substrate and applied to articles of clothing purchased by the consumer with a heated press by boutique operators, or can be applied directly to an article of clothing. The indicia can include either simple one-color block letters or elaborate multi-color illustrations.

In common use in the silk screening industry are a multi-station turret type (U.S. Patent Publication No. 2011/0290127) and oval-type (U.S. Patent Publication No. 2010/0000429) printing presses (both of these patent applications are incorporated herein by reference and made a part hereof). These printing presses have a plurality of flat beds or platens spaced along their perimeter, one for each color. The number of stations employed depends on the number of colors to be printed on the object. Indicia can consist of up to ten colors or more.

One significant challenge in screen printing is the time necessary to prepare each screen. The general process for setting-up the screens for printing follows:

First, the artwork is set up. The artwork, in the form of a film positive, is secured on a layout board. Next, a carrier sheet (optically clear polyester film) is placed on the layout board. An individual separates the colors by transferring the artwork by hand to one or more carrier sheets. In this separation/transference process, each carrier sheet represents a separate color to be used in the final screened textile. Thus, if there are six colors being screened, there will be six carrier sheets (art separations) completed.

Second, the stenciled screens are made (one for each color or print head). The indicia or design is formed in the screen by a conventional process. The mesh of the screen is generally covered with an ultraviolet sensitive emulsion and put into a vacuum exposure unit, basically having a light source, a vacuum, a cover, and a table disposed therebetween. Each carrier sheet is aligned with an emulsion covered, pre-stretched screen such that the carrier sheet is disposed between the light source and the screen. The cover is closed and the screen/carrier sheet combination is subjected to a vacuum, to bring them into contact with one another, and UV light. The exposed screen is then chemically processed resulting in a printing screen. With modern techniques and chemicals, processing can be performed by applying a high power water spray to the exposed screen.

When exposed to ultraviolet (UV) light and processed (often by a power water spray), those portions or mesh of the screen covered (such as by stencil) are left open (interstices are formed), permitting light, paint, or ink to pass through the mesh. Those portions of the screen mesh not covered by a stencil, once exposed and processed, become opaque, blocking the passage of light, paint, or ink through the mesh.

Specifically, those parts of the mesh not exposed to the UV light (the unexposed stencil/design) wash away and produce openings or interstices in the mesh for the ink to pass therethrough during the printing process. The interstices in screen represent the places where ink of a particular color is to be deposited onto the textile or other substrate.

Third, each printing screen is secured to a printing head. One color of ink is then placed into each printing head.

The textiles, one at a time, are loaded onto the travelling pallets and the pallets travel to each of the printing stations, each station having a different color of ink therein. The ink is applied to each textile through the screen at each station. Each textile is cured and the ink permitted to set.

One attempt to speed the screen preparation process is a direct to screen (DTS) machine disclosed in commonly assigned U.S. Patent Publication No. 2014/0261029 which is incorporated herein by reference and made a part hereof. Even with DTS (direct to screen) machines, it can require 10-20 minutes to prepare each screen.

One alternative to screen printing is DTG (direct to garment) digital printers with piezo heads. These DTG machines have the advantage of being able to separate the colors from a digital file loaded onto a computer controller of the machine, and then simply spray the colors onto the garment through piezo heads. The limitation is that the piezo heads can be extremely slow when compared to screen printing, so it has not been economical to use DTG printing machines for large run garment jobs, nor to mix digital printers in with a screen printing machines because it slows the screen printing press down by about a factor of one-half to two thirds.

Also, most garment prints require an under base, which is generally white or very light. Getting enough white pigment through the piezo heads to do the under base, especially on a dark garment that requires a heavy coat, has been and is still very difficult. This has further delayed the wide-spread use of digital printing of textiles.

The present invention provides a machine and process that combines the positive attributes of silk screening and digital printing by dedicating the screen printing process to applying the white or light under base, and dedicating the digital printing to the other colors. Thus, far fewer screens will be required which will result in a significant time savings. The digital printer will be dedicated to applying much smaller volumes of ink and by using a large number of print heads, the speed of the digital printer can match the speed of the silk screening.

BRIEF DESCRIPTION OF THE DRAWINGS

To understand the present invention, it will now be described by way of example, with reference to the accompanying drawings and attachments in which.

DETAILED DESCRIPTION

Figure 1:
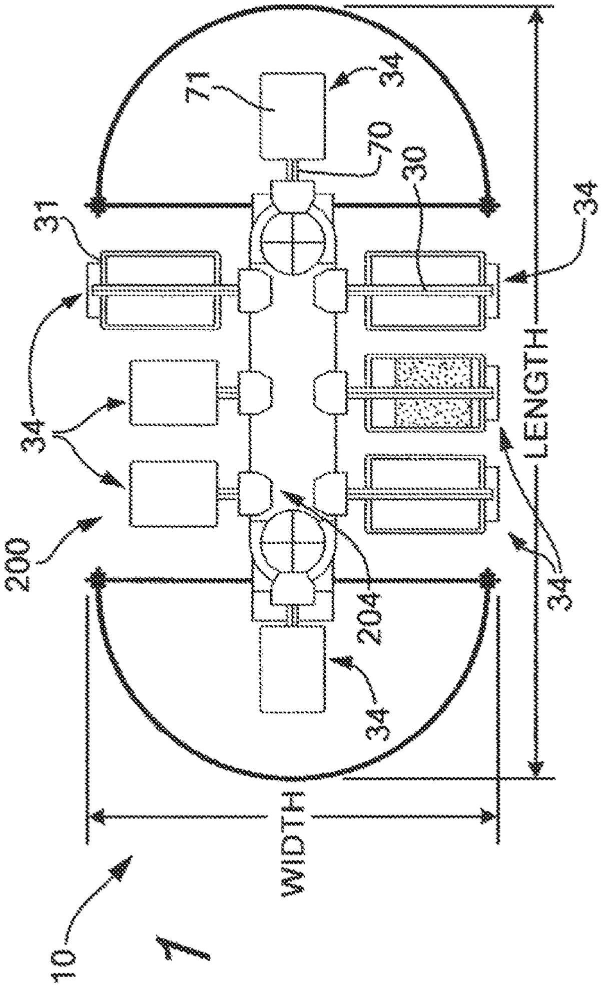
FIG. 1 is a diagrammatic view of an oval printing press from commonly assigned U.S. Patent Publication No. 2010/000429.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
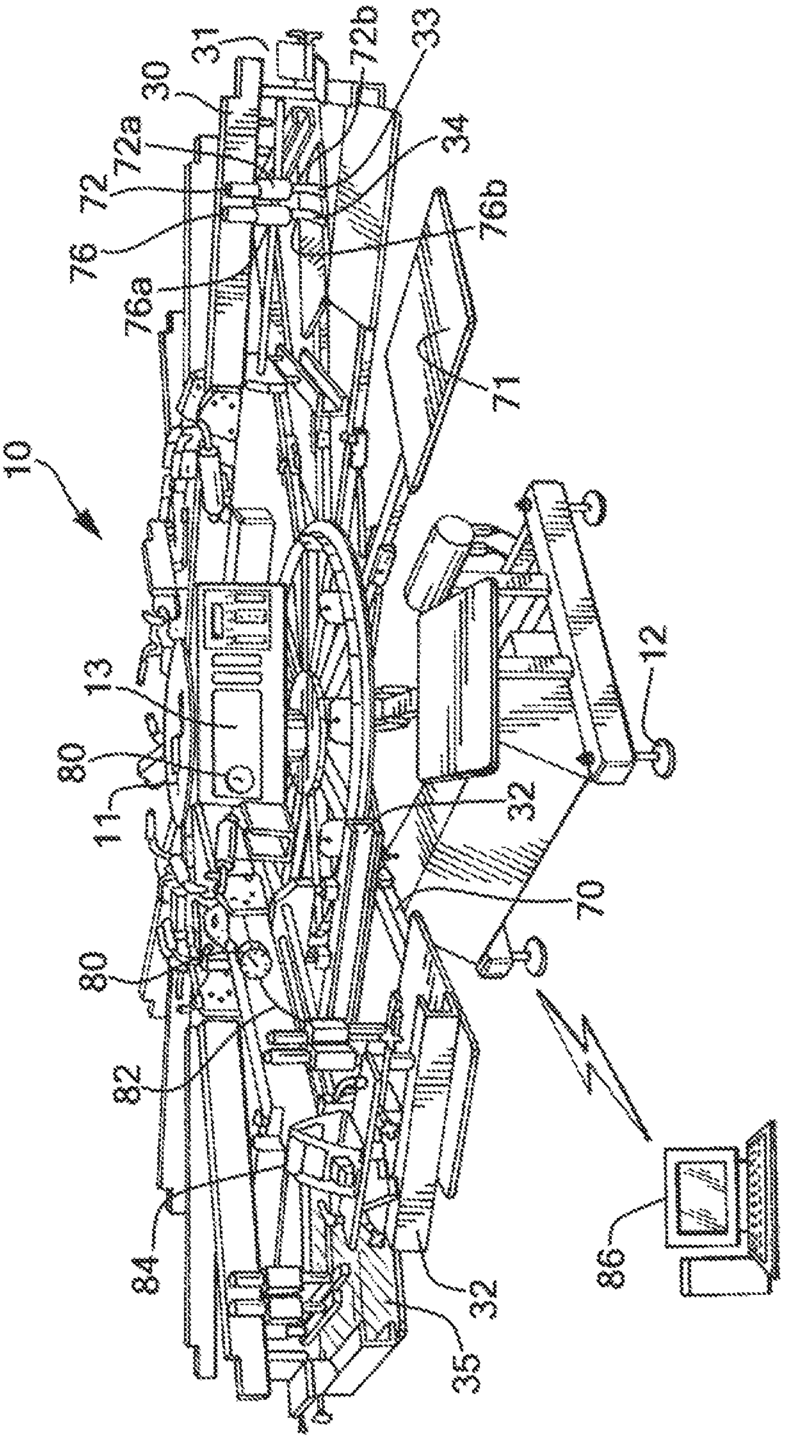
FIG. 2 is a diagrammatic view of a turret-style printing press from commonly assigned U.S. Patent Publication No. 2011/0290127.

FIGS. 1 and 2 show prior art screen printing machine having an oval track or rail (FIG. 1) or a circular track or rail (FIG. 2) about which a series of pallets supporting a work piece are indexed from station to station. The arrangement is such that the pallets travelling about the oval or round rail are maintained in a common plane. There are a variety of station types including a screen printing station, an ink drying or curing station, a loading station, an unloading station and other stations to serve other purposes that are well known to those of ordinary skill in the art.

The screen printing head assembly 20 is pivotally connected on a frame to overlie a pallet and is mounted for movement between a printing position and a non-printing position. The printing head includes a frame for supporting a printing screen that has a desired pattern for printing a white base coat only, as described below. A squeegee carriage carrying a squeegee and a flood bar is movably mounted on the frame for traversing a printing stroke when the head assembly is disposed in the printing position and a flood stroke when the head assembly is in the non-printing position.

Operatively connected to the frame of the head assembly are one or more locating bars which are cooperatively associated with the pallets so as to ensure proper registration of the pallets when the printing head assembly is disposed in the printing position. The conveyor is driven on its endless path by a drive mechanism such as a chain or belt which is threaded about a sprocket journalled on a main drive shaft which is coupled in driving relationship to a drive motor. Operatively associated with the drive mechanism is an indexing system to effect an intermittent indexing of the respective pallets from station to station during machine operation.

Figure 3:
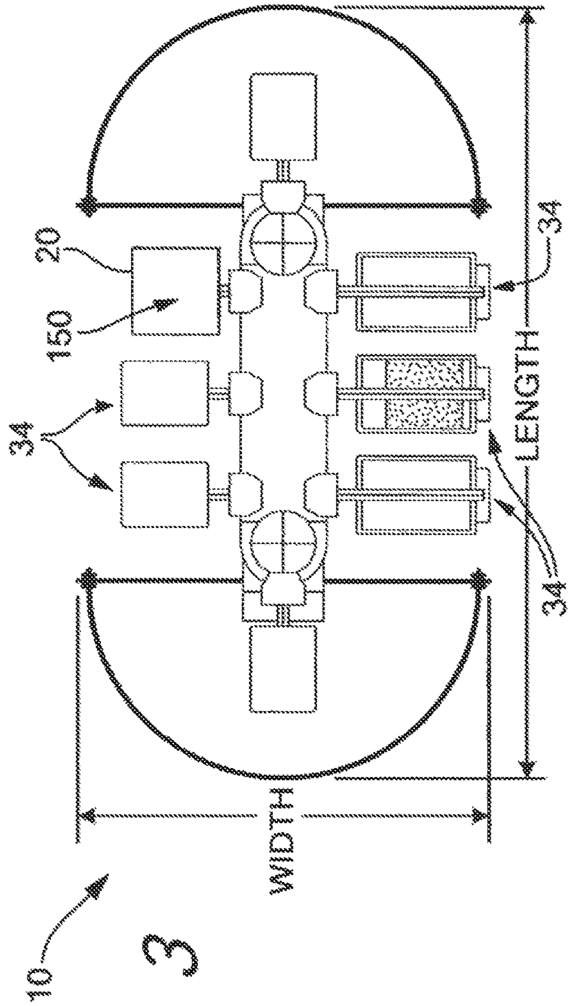
FIG. 3 is a diagrammatic view of a hybrid press having silk screen stations and a direct-to-garment station.

FIG. 3 shows a hybrid printing station 10 having, among the screen printing stations 34 and other stations mentioned above, a direct-to-garment ("DTG") printing station 20. The DTG print station 20 can be integral to the machine or can be a separate, independent unit that is moved into position during print set up for printing in a printing zone 150 of a substrate or textile. The independent unit can include a set of casters or slides (not shown) for ease of movement.

FIG. 4 shows the DTG print station 20 has a housing 180 enclosing a top portion 182 of a DTG print head array and a carriage 160 for moving along a Y axis of the printing zone 150. The DTG print head array spans a width of the printing area, and, therefore, the carriage only need move in the Y-direction and not the X-direction thereby speeding the printing of an image. A bottom 184 of the DTG print station is open to allow the DTG print head array to cooperatively engage the substrate and print thereon. A printing operation can include from 1 to 10 round trips, more preferably 2 to 8 round trips, and most preferably 3 to 6 round trips. Resolution increases with the number of round trips but the time for completing the printing operation increases with the number of round trips. With four round trips a resolution of 600×900 dots per inch (DPS) can be achieved which is suitable for many print jobs. It is contemplated that with forthcoming improvements in print head technologies that the number of round trips can be reduced to a single round trip to complete printing of a suitable image.

Figure 5:
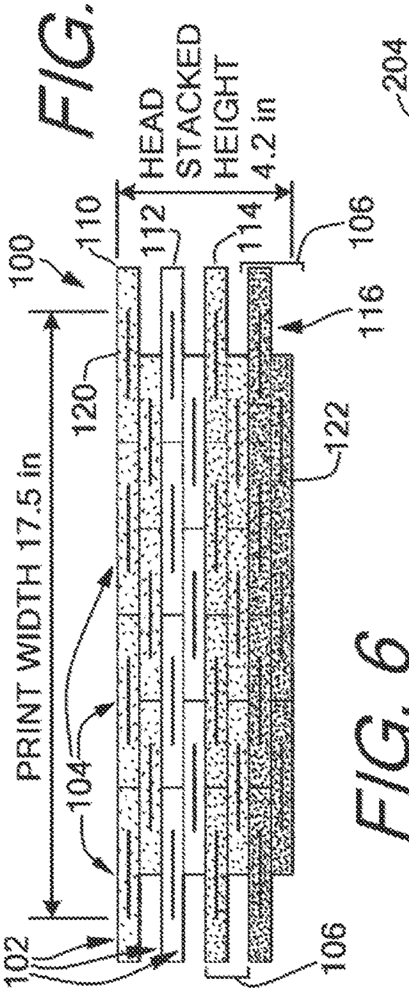
FIG. 5 is a plan view of a direct-to-garment printing head array.

In one preferred form of the invention, the DTG print head 100 is capable of printing in four colors: cyan, magenta, yellow and black, and using combinations of these colors virtually any color can be made. FIG. 5 shows one preferred form of a DTG print head having a plurality of print heads positioned in an array of rows 102 and columns 104. By removing the need for the print head array to move along the X axis, printing speed is substantially increased.

Preferably, there are from 1 to 10 print heads in each row and from 4 to 20 print heads in each column. Each column has from 1 to 5 print heads for each color. In one preferred form of the invention, each column has a plurality of groups 106 of 1 to 5 consecutively stacked print heads and each group is dedicated to a single color. Preferably, each group of print heads is organized by color and preferably in the order of cyan 110, magenta 112, yellow 114, and black 116 from a top or front row 120 to a bottom or back row 122. The number of print heads in each group of the plurality of groups of print heads has the same number of print heads as the other groups or a different number of print heads from the other groups.

Similarly, the number of print heads in each row can be the same or can be different. In one preferred form of the invention, a first row will have n print heads and an adjacent row will have n−x print heads where x is from 1-3 print heads and preferably one. FIG. 5 shows an array having a stack of eight print heads having a first row having four print heads and the next row having three print heads and this pattern repeats for the remaining six rows.

Each print head of the DTG print head can have a single nozzle or a plurality of nozzles such as from 2-12 nozzles, more preferably from 3-10 and most preferably 8 nozzles per print head.

Figure 4A:
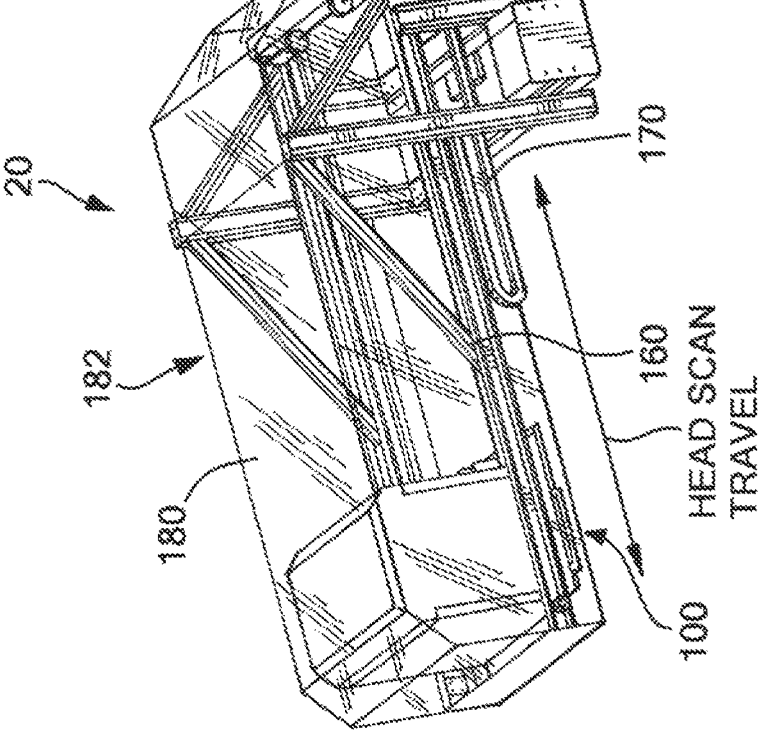
FIGS. 4A and 4B are perspective views of a direct-to-garment printing station in a non-printing position and a printing position respectively.
Figure 4B:
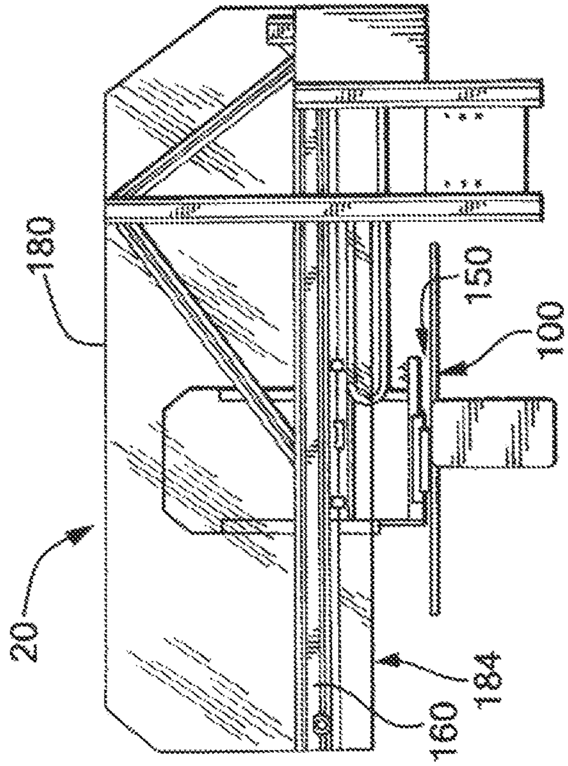
Figure 6:
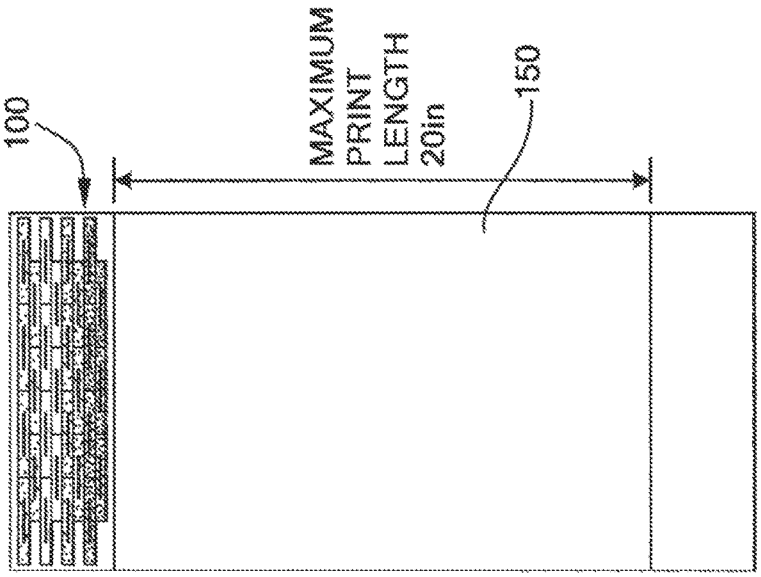
FIG. 6 is a plan view of a direct-to-garment print head and a printing zone of a direct-to-garment printing station.

FIG. 6 shows the DTG print head array 100 in the non-printing position proximate the printing zone 150. FIG. 4A shows a DTG print station 20 having the DTG print head array 100 mounted on a carriage 160 and is moveable by a driver 170 along the Y axis from the non-printing position (FIG. 4A) to a printing position (FIG. 4B) in a round trip. The time for completing the round trip can be determined by the carriage speed which can be from about 10 in/sec to about 50 in/sec, more preferably from about 20 in/sec to about 40 in/sec and most preferably about 30 in/sec.

Figure 7:
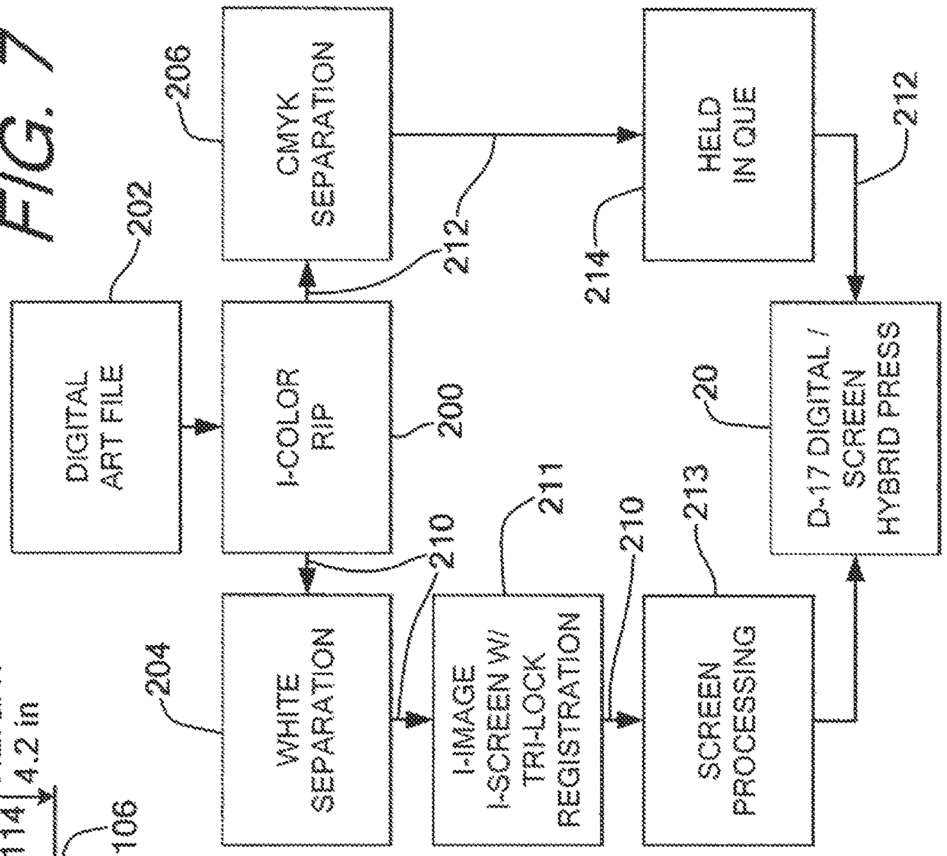
FIG. 7 is a work flow diagram of printing from a digital art file to both a screen printing station and a direct-to-garment printing station.

FIG. 7 shows a work flow diagram for controlling the printing operation. It is desirable to divide the printing operation so that white ink or base coat is applied by a print screening station 34 and the printing of CMYK colors by the DTG print station 20. To this end, a raster image processor 200 (RIP) controls a portion of the printing process and specifically is able to print from a digital art file, loaded into memory of the RIP, containing an electronic representation of the desired indicia to be printed. In addition to the memory, the RIP 200 has a processor and a memory for storing computer-readable instructions for converting the digital art file 202 into two files—the first file 204 representing the base coat location and the second file 206 representing the CMYK location. The RIP sends a first signal 210 representative of the white base coat to a direct to screen (DTS) machine 211 for preparing a screen for printing the base coat. This screen is then processed 213 as described above and is mounted in one of the screen printing heads 34 for a print job. A second signal 212 is sent to a DTG print head queue 214 for printing the CMYK colors on top of the base coat.

The digital art file 202 can be in any suitable format known to those skilled in the art including .jpeg, .pdf, .ppt, .bmp, .dib, .gif, .tiff, .png, and .ico.

Suitable inks for printing by the hybrid printing machine includes, for example, plastisol (with and without additives, such as expanding inks), water based inks, PVC (preferably phthalate free), discharge inks (which remove die), foil, glitter/shimmer, metallic, caviar beads, glosses, nylobond, mirrored silver and other solvent based inks. Textiles include natural and artificial fibers from animals (e.g., wool and silk), plants (e.g., cotton, flax, jute, hemp, modal, piña and ramic), minerals (e.g., glass fibers) and synthetics (e.g., polyester, aramid, acrylic, nylon, spandex/polyurethane, olefin, ingeo and lurex). Each combination of ink and textile will demonstrate different properties, such as those associated with wicking, holding, hand, penetration and appearance.

The process of printing an indicia onto a substrate includes the steps of loading a digital art file of the indicia into a memory, converting the digital art file into two files, a first file representative of a white base coat portion of the indicia and a second file representative of the CYMK colors of the indicia. Using a processor, sending a signal representative of the first file to a DTS machine to prepare a screen for printing the base coat on a substrate or textile. Sending a second signal to a DTG print station where it is held in memory. The screen for the base coat is loaded onto a screen printing station of a hybrid printing machine and the station is loaded with a white or light colored ink. A textile is loaded onto a platen of a hybrid machine and conveyed into a position under the silk screen printing station and the base coat is applied to form a prepared textile. The platen of the hybrid machine is then conveyed to a position under the DTG print station and the CMYK colors are printed on the prepared textile on top of the base coat in accordance with the second file. Preferably, the DTG print station has a DTG print head with an array of print heads that span a width dimension of the indicia such that the DTG print head need only be moved along a length dimension of the indicia to form the indicia. Upon completion of the printing, the ink is cured or dried and the completed textile can be sold or packaged for sale.

Many modifications and variations of the present invention are possible in light of the above teachings. It is, therefore, to be understood within the scope of the appended claims the invention may be protected otherwise than as specifically described.

We claim:

1. A hybrid digital and screen printing system comprising:

at least one digital-to-garment (DTG) printing station positioned proximate a conveyor and having a print head moveable into a printing zone, the print head has a plurality of print heads positioned in an array of rows and columns;

a direct to screen (DTS) printing machine for preparing a silk screen for use in the DTG printing station; and a raster image processor (RIP) electronically coupled to the DTG printing station and the DTS printing machine, the RIP having a processor, and a memory storing computer-readable instructions.

2. The hybrid digital and screen printing system of claim 1 wherein when the computer-readable instructions are executed by the processor it takes the following steps:

store in the memory a digital art file containing an electronic representation of the colors and their locations to be printed on the substrate to produce an indicia;

sending a first signal to the DTS printing machine representative of a base coat of the indicia; and sending a second signal to the at least one DTG printing station representative of the cyan, magenta, yellow, and black colors of the indicia.

3. The hybrid digital and screen printing system of claim 1 wherein the printing zone has a length dimension and a first width dimension and the print head is mounted for movement exclusively along the length dimension of the printing zone.

4. The hybrid digital and screen printing system of claim 1 comprising an endless conveyor.

5. The hybrid digital and screen printing system of claim 4 comprising a plurality of object supports connected to the conveyor and spaced from one another and moveable with the conveyor, each of the object supports defining a printing zone having a length dimension and a first width dimension.

6. The hybrid digital and screen printing system of claim 1 comprising 1 to 10 print heads in each row.

7. The hybrid digital and screen printing system of claim 1 comprising 4 to 20 print heads in each column.

8. The hybrid digital and screen printing system of claim 1 wherein each row is dedicated to a single color.

9. The hybrid digital and screen printing system of claim 1 wherein the rows follow in an order of cyan, magenta, yellow, and black.

10. The hybrid digital and screen printing system of claim 1 wherein a first row will have n number of print heads and an adjacent row will have n-x number of print heads where x is from 1 to 3 print heads.

11. A method of printing an indicia on a substrate with a hybrid digital and screen printing press from a digital art file containing an electronic representation of the colors and their locations to be printed on a substrate to produce the indicia, the method comprising:

providing a digital-to-garment (DTG) printing station having a print head for printing in a printing zone;

providing a direct to screen (DTS) printing machine for preparing a silk screen for use in the DTG printing station;

sending a first signal to the DTS printing machine representative of a base coat of the indicia; and sending a second signal to the DTG printing station representative of the non-base coat colors.

12. The method of claim 11 further comprising the step of electronically processing the digital art file into a first file representative of a base coat portion of the indicia and a second file representative of the non-base coat colors.

13. The method of claim 11 wherein the non-base coat colors includes cyan, yellow, magenta and black.

14. The method of claim 11 further comprising printing with the DTS machine a base coat on a first substrate.

15. The method of claim 14 further comprising conveying the first substrate to the DTG printing station and printing the non-base coat colors on top of the base coat to complete the indicia.

16. The method of claim 11 wherein the print head has a plurality of print heads positioned in an array of rows and columns.

17. The method of claim 16 wherein there are from 1 to 10 print heads in each row.

18. The method of claim 16 wherein there are from 4 to 20 print heads in each column.

19. The method of claim 16 wherein a first row will have n number of print heads and an adjacent row will have n-x number of print heads where x is from 1 to 3 print heads.

* * * * *